United States Patent [19]

Smeal

[11] 3,773,703

[45] Nov. 20, 1973

[54] EPOXY ADHESIVE COMPOSITION

[75] Inventor: Thomas W. Smeal, Franklin Twp., Westmoreland County, Pa.

[73] Assignee: United States Steel Corporation, Pittsburgh, Pa.

[22] Filed: Jan. 19, 1972

[21] Appl. No.: 219,174

[52] U.S. Cl.......... 260/33.6 EP, 260/24, 260/37 EP
[51] Int. Cl............................................. C08g 51/28
[58] Field of Search .................. 260/37 EP, 33.6 FP, 260/24

[56] References Cited
UNITED STATES PATENTS 3,532,653  10/1970  Smeal.......................... 260/37 EP X
3,649,589  3/1972  Mayfield......................... 260/37 EP Primary Examiner—Lewis T. Jacobs
Attorney—Gene Harsh et al.

[57] ABSTRACT

Epoxy-type adhesive compositions comprising glycidyl polyether of a dihydric phenol, filler, a flexibilizer and a curing agent, preferably, a mixture of an amine hardener and a rigidifying tertiary amine catalyst. Enhancement of special properties is obtained by admixing a silane or silicone adhesion promoter. The use of a low cost amine hardener is made possible by the addition of an aromatic dihydroxy compound and/or a high boiling coal-tar fraction.

10 Claims, No Drawings

EPOXY ADHESIVE COMPOSITION

BACKGROUND OF THE INVENTION

This invention relates to modified epoxy compositions having application as adhesives hardening at room temperature with high tensile shear and peel strengths over a wide service-temperature range and relative insensitivity to dirty surfaces. More particularly, the invention relates to an epoxy-resin composition modified with filler and a flexibilizer and further modifiable with a silane or silicone adhesion promoter, an aromatic dihydroxy compound, and/or a high-boiling coal-tar fraction. The compositions are cured at room temperature with a novel mixture of an amine hardener, a rigidifying catalyst, and an aromatic dihydroxy compound and/or a high-boiling coal-tar fraction.

Modified epoxy resin compositions are well known in the art and are described, for example, in U.S. Pat. Nos. 2,500,499, 3,033,088 and 3,062,771. Among the preferred resins are glycidyl polyethers of dihydric phenols having epoxy equivalencies greater than 1. The resins may be modified by fillers, high boiling oil fractions and a variety of other materials to enhance their properties. A great number of curing agents have been specified to solidify the compositions at room temperature. These prior art compositions, when used as adhesives, have good properties at ambient temperatures, but they lose most of their tensile and peel strengths at temperatures near the extremes of about −67° and 180°F. Room-temperature hardened polymers resistant to this temperature range are usually rigid and poor in resistance to peel stresses. Flexible polymers have good peel resistance but are not resistant to temperature extremes, especially elevated temperatures. Additionally, non-porous substrates, for example, metal sheets must be cleaned carefully before application of such adhesive compositions.

In U.S. Pat. No. 3,532,653, epoxy-resin adhesives containing a novel combination of chemical curing agents, relatively large amounts of specific mineral fillers and flexibilizers, small amounts of silane or silicone adhesion promoters and/or relatively large amounts of high-boiling coal-tar fractions are disclosed. These compositions, however, required the use of expensive flexibilizing primary polyamine hardeners.

SUMMARY OF THE INVENTION

I have now discovered that the adhesive qualities of epoxy-resin adhesive compositions may be maintained or improved and the cost considerably lowered by replacing expensive flexibilizing amine hardeners with inexpensive rigidifying primary polyamine hardeners used in conjunction with an aromatic dihydroxy compound and/or high-boiling coal-tar fraction. Surprisingly, in light of the known fact that when aromatic dihydroxy compounds are added as accelerators to epoxy-resin compositions, they tend to rigidify the resin composition, I have found that the combination of a usually rigidifying polyamine and an aromatic dihydroxy compound yields an adhesive composition that is flexible and has high peel strength.

My compositions comprise between 15 and 60 percent of a glycidyl polyether of a dihydric phenol having an epoxy equivalency greater than 1, about 25 to 70 percent of a filler such as talc, silica, dolomite, anhydrous calcium sulfate and aluminum silicate, about 1 to 7 percent of a flexibilizer such as poly(vinylalkyl ether), where the alkyl group comprises from one to five carbon atoms, rosin ester, solid polyamide resin (i.e., the condensation product of an organic diamine and an organic dibasic acid such as the condensation product of hexamethylene diamine and adipic acid), or a copolymer of styrene and butadiene. A curing agent for the polyether comprises approximately a stoichiometric amount of a mixture of an amine hardener and a rigidifying tertiary amine catalyst as more particularly defined below. To this composition may be added between about 0.5 and 2 percent of a silane or silicone adhesion promoter, about 0.5 to 10 percent of an aromatic dihydroxy compound, and about 10 to 40 percent of a coal-tar fraction boiling between about 500° and 900°F. All percentages are by weight of the total composition including any additives.

DETAILED DESCRIPTION

A preferred group of epoxy ethers useful in my invention is prepared by reacting a dihydric phenol with epichlorhydrin in alkaline solution. The products comprise ethereal oxygen and glycidyl groups in such quantity that the products have 1,2-epoxy equivalency in the average molecule greater than one. By epoxy equivalency, reference is made to the average number of 1,2-epoxy groups

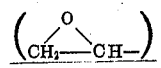

contained in an average molecule or the ether. The products are of resinous character and are either solid or liquid materials at normal temperature (20° – 30°C). Any of the various dihydric phenols may be used in preparing the glycidyl ethers, and which preferably contain only one or two benzene ring systems, for example, mononuclear phenols such as resorcinol, catechol, hydroquinone; polynuclear phenols such as bis-(4-hydroxyphenyl)-2,2-propane (bisphenol), 4,4'-dihydroxy benzophenone, bis-(4-hydroxyphenyl)-1,1-ethane, bis(4-hydroxylphenyl)-1,1 - isobutane, bis-(4-hydroxyphenyl)-2,2-butane, bis-(4-hydroxy - 2-methylphenyl)-2,2-propane, bis-(hydroxy-2-tertiarybutyl phenyl)-2,2-propane, bis- (2-dihydroxynaphthyl)-methane, and 1,5-dihydroxy naphthalene. The products may be represented by the formula:

wherein $n$ is an integer, preferably from 0 to 7, and R represents a divalent hydrocarbon radical of a dihydric phenol. A preferred phenol is bis-phenol A, i.e. bis-(4-hydroxyphenyl)-2,2-propane. Preferred epoxy ethers for use in the invention are those having epoxy values no less than 0.20 (pyridinium chloride method), and melting points up to about 80°C. (Durran's mercury method). A glycidyl ether resin will contain at least one epoxy group and usually less than two per molecule. Epoxide equivalent weight is defined as the number of grams of resin containing 1 gram equivalent of epoxide. Successful adhesives were prepared with commercially available epoxy resins in the above classification, for example, Epotuf 37-139 (diglycidyl ether of bis-phenol A, epoxy equivalent 182 to 195, viscosity 5,000 to 10,000 centipoises) and Epotuf 37-140 (diglycidyl ether of bis-phenol A, epoxy equivalent 185 to 200, viscosity 10,000 to 19,000 centipoises), Epon 828 (diglycidyl ether of bis-phenol A, epoxy equivalent 185 to 192, viscosity 10,000 to 16,000 centipoises), ERL-2772 (diglycidyl ether of bis-phenol A, epoxy equivalent weight 175 to 185, viscosity 7,000 to 9,000 centipoises), ERL-2774 (diglycidyl ether of bis-phenol A, epoxy equivalent 180 to 195, viscosity 11,000 to 13,500 centipoises), Epi-rez 508 (molecularly distilled diglycidyl ether of bis-phenol A, epoxy equivalent weight 171 to 177, viscosity 3,600 to 5,500 centipoises), Epi-rez 510 (liquid diglycidyl ether of bis-phenol A, epoxy equivalent weight 180 to 200, viscosity 10,000 to 16,000 centipoises), DER 330 (diglycidyl ether of bis-phenol A, epoxy equivalent weight 182 to 189, viscosity 7,000 to 10,000 centipoises), and DER 331 (liquid diglycidyl ether of bis-phenol A, epoxy equivalent weight 186 to 192, viscosity 11,000 to 14,000 centipoises). All viscosities are at 25°C.

Preferred fillers for my adhesives have been found to be talc, silica (preferably ground to pass 200 mesh), dolomite (a mixture of calcium and magnesium carbonates), anhydrous calcium sulfate, and aluminum silicate. A balance of desirable properties is secured with a mixture of approximately equal parts by weight of dolomite and aluminum silicate.

Only a relatively few of a relatively large number of possible flexibilizers were found to improve low-temperature properties without degrading high-temperature properties. These flexibilizers are poly(vinyl alkyl ether) where the alkyl group comprises one to five carbon atoms, rosin esters, solid polyamide resins and copolymers of styrene and butadiene. The poly(vinyl alkyl ether) compounds are polymers having from about 10 to about 4,000 repeating units; preferably 100 to 2,000 and the alkyl group has from one to five carbon atoms. All of these compounds have a molecular weight of about 500 to about 200,000; preferably about 5,000 to 100,000. In the specification and claims it is to be understood that the term "flexibilizer" means a material developed to impart flexibility to a resinous composition.

The prior art has proposed a relatively large number of room-temperature curing agents. For purposes of my invention, and in the specification and claims, primary and secondary amines are classified as hardeners and tertiary amines are "rigidifying" catalysts. Most primary and secondary amine hardeners are not useful in my invention.

The products resulting from the use of an amine-hardener as opposed to a rigidifying catalyst would appear to be quite dissimilar since the preferred primary amine-hardeners combine with the epoxy resins in addition-type reactions to give products having little heat resistance. On the contrary, rigidifying catalysts usually do not enter into the reaction but serve to open the epoxy rings to permit epoxy to epoxy bonding. The products are very hard and rigid with excellent heat resistance. Surprisingly, and quite unexpectedly, I have found synergism in combining a hardener and a rigidifying catalyst, since the desirable properties thereof were retained and the undesirable properties thereof were overcome with a suitable amount of an aromatic dihydroxy compound and/or high boiling coal-tar fraction. Preferred are primary polyamine hardeners having a chain of 2 carbon groups with two to seven carbon atoms per group, an ether link between the groups and an amine group on each end of the chain (e.g., liquid diamines having the general formula

wherein $n$ has a value of 2 to 7 inclusive and $x$ has a value of 2 to 7 inclusive. For example, suitable liquid diamines have the formulae

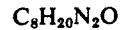

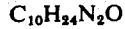

The preferred aromatic dihydroxy compounds are resorcinol and bisphenol-A. Preferred rigidifying tertiary amine catalysts are tri(dimethyl amino methyl) phenol, dimethyl amino methyl phenol and benzyl-dimenthylamine. These catalysts are commercially available respectively as DMP-30, DMP-10 and BDMA. It is necessary that the tertiary amine catalyst have at least six carbon atoms, and it is preferred that the tertiary amine catalyst have six to 20 carbon atoms, the most preferred tertiary amines are those that boil above about 85°C. Relative to the epoxy resin an approximately stoichiometric or equivalent amount of curing agent mixture gives satisfactory results; broadly, between about 0.90 and 1.10 and preferably between about 1.00 and 1.05 times the stoichiometric amount of a mixture. It has been found that the relative proportions of hardener and catalyst in the mixture are extremely critical. For example, a stoichiometric amount of a flexibilizing primary polyamine hardener produced an adhesive weak at 77°F and higher temperatures, but with excellent low-temperature peel strength. Replacing about 30 to 50 percent of the hardener with a stoichiometrically equivalent amount of a rigidifying tertiary amine catalyst greatly improved the adhesive strength at 77°F and above, without significantly lowering the low-temperature peel strength. This is quite surprising, since it would be expected that the low-temperature peel strength would gradually decline as the proportion of catalyst increases. It has been found, however, that low-temperature peel strength is relatively unaffected until about 50 percent replacement with catalyst. Thereafter, this strength deteriorates quite rapidly and is practically non-existent with about a 60 percent replacement. It has been found that the curing agent mixture may be between about 70 and 50 percent hardener and 30 and 50 percent catalyst, preferably between about 67 and 60 percent hardener and 33 and 40 percent catalyst.

A stoichiometric amount of hardener is defined as the amount supplying exactly one active hydrogen for each epoxy group in a given mass of resin. Actually, there is no corresponding stoichiometric amount for a catalyst. There are, however, manufacturers' recommendations for an amount to provide an adequate degree of curing within a reasonable period of time. In the specification and claims such amounts are considered "equivalent" or "stoichiometric."

It has been found that the broad limits for a basic adhesive composition comprises in percent by weight between about 15 and 60 percent resin, between about 25 and 70 percent filler, between about 1 and 7 percent flexibilizer, between about 0.5 and 14 percent amine hardener, between about 0.3 and 3 percent rigidifying tertiary amine catalyst and between about 0.5 and 10 percent aromatic dihydroxy compound and/or 10 to 40 percent high-boiling aromatic oil. Preferably, a composition comprises between about 18 and 50 percent resin, between about 30 and 60 percent filler, between about 2 and 5 percent flexibilizer, between about 2.5 and 11 percent hardener, between about 0.5 and 2 percent catalyst, and between about 1 and 4 percent aromatic dihydroxy compound and/or 15 to 30 percent of high-boiling aromatic oil with a coal-tar oil boiling at 670° to 850°F being preferred.

When the above described amine hardener is used in the adhesive composition without added aromatic hydroxy compound or aromatic oil, low peel strength due to decreased flexibility results. The addition of the aromatic hydroxy compound increases the peel strength to above that obtained when a flexibilizing amine hardener is used. The addition of aromatic oil alone increases the peel strength somewhat but for most applications not to a sufficient level. The preferred adhesive composition contains suitable amounts of both aromatic hydroxy compound and aromatic oil.

It has been found that the hereinabove described compositions may be improved by the addition of other materials. The above compositions show improved strength properties, moisture resistance and handling properties by the addition thereto of relatively small amounts of certain silanes or silicones. In the specification and claims, reference will be made to those silanes and silicones which are commercially available materials, developed specifically as adhesion promoters, as silane and silicone adhesion promoters. Broadly useful additions are between about 0.2 and 2 percent by weight. The preferred range is between 0.4 and 1.2 percent. Useful commercially available materials include Silane A-1100 (gamma-aminopropyltriethoxysilane), Silane A-186 (3,4-epoxy-cyclohexylethyltrimethoxysilane), Silane A-187 (glycidoxylpropyltrimethoxysilane) and Paint Additive 21. The latter is designated a silicone by the manufacturer, e.g. N-beta-(aminoethyl)-gamma-aminopropyltrimethoxysilane [$NH_2CH_2CH_2NH(CH_2)_3Si(OCH_3)_3$] in n-butyl alcohol.

The above basic composition with or without the addition thereto of silane or silicone adhesion promoters, become surprisingly insensitive to dirty and to galvanized surfaces, and more moisture resistant and tacky when there is added thereto a relatively large amount of a coal-tar fraction, boiling between about 500° and 900°F, more preferably, boiling between about 670° and 850°F. Additions may be between about 20 and 40 percent by weight of the total composition, more preferably between about 25 and 30 percent of the total composition of from 1.1 to 1.7 times the weight of epoxy resin in the composition. Coke oven derived coal tar is preferred. The useful boiling range corresponds to that of a so-called heavy creosote fraction.

A complete understanding of the invention may be obtained from the following typical examples of process showing how the compositions are made and some of the properties thereof. The designated properties were determined by standard ASTM methods, more particularly, D1002-53T (tensile shear strength), D903-49 (peel strength) and D1781-60T (climbing drum peel strength).

In the following examples:

Epoxy resin is a condensation product of bisphenol-A and epichlorohydrin with an epoxide equivalent of 185 to 195 and a viscosity at 77°F of 5,000 to 10,000 centipoises.

ASP-400 is aluminum silicate, grade ASP 400.

Gellant is the reaction product of dodecyl amine with anhydrous aluminum silicate (bentonite) prepared as in Example 2 of USP 2,531,427.

Flexible polyamine hardener is $H_2N-CH_2-CH_2-CH_2-(O-CH_2-CH_2-CH_2)_3-NH_2$.

Catalyst is tri(dimethylaminomethyl) phenol.

Adhesion promoter is $NH_2CH_2CH_2NH(CH_2)_3Si(OCH_3)$ in n-butyl alcohol.

Polyamine X hardener is $H_2N(C_4H_8)O(C_4H_8)NH_2$.

In all of the following examples, the parts are by weight unless otherwise specifically indicated.

EXAMPLES 1 – 3

Example 1 shows the excellent adhesive strength results obtained when a composition employing a flexibilizing primary polyamine hardener having a chain of 4 carbon groups with three carbon atoms per group, an ether link between the groups, and an amine group on each end of the chain is used. Example 2 shows that when a primary polyamine hardener (polyamine X) having only 2 carbon groups with four carbon atoms per group, only one ether link, and an amine group on each end of the chain is used, insufficient flexibility and thus reduced peel strength is obtained. Example 3 shows that, surprisingly, the composition of Example 2 will produce peel strengths equal to or better than those of Example 1 if an aromatic dihydroxy compound (resorcinol) is included. The adhesives in these examples were all cured for 3 minutes in a 400°F forced-draft oven.

| Composition | Ex. 1 | Ex. 2 | EX. 3 |
|---|---|---|---|
| Epoxy resin | 48.0 | 48.0 | 46.7 |
| Filler, talc | 34.2 | 34.2 | 34.9 |
| Flexibilizer, poly(vinyl ethyl ether) | 4.0 | 4.0 | 3.9 |
| Gellant | 2.0 | 2.0 | 2.0 |
| Flexible polyamine hardener | 8.7 | | |
| Polyamine X hardener | | 8.7 | 7.9 |
| Catalyst | 1.9 | 1.9 | 1.5 |
| Adhesion promoter | 1.2 | 1.2 | 1.2 |
| Resorcinol | | | 1.9 |
| Adhesive Strength Properties | Ex. 1 | Ex. 2 | Ex. 3 |
| Lap-shear strength, psi, at −67°F | 4100 | 3850 | 3800 |
| 77°F | 3150 | 3350 | 3050 |
| 180°F | 3050 | 3150 | 3300 |
| 77°F after 28 days in water | 3450 | 3500 | 3300 |
| 180-Degree peel strength, ppi, at −67°F | 50 | 40 | 60 |
| 77°F | 35 | 25 | 45 |
| 180°F | 35 | 25 | 35 |
| Climbing-drum peel strength, ippi, at 77°F | 25 | 15 | 25 |

EXAMPLES 4 AND 5

These examples demonstrate that, in the presence of a large amount of coal-tar boiling between about 670° and 845°F, there is the unexpected result that polyamine X will produce adhesive strengths equivalent to those obtained with the flexibilizing polyamine of Example 1 upon curing both compositions for 10 days at room temperature.

| Composition | Example 4 | Example 5 |
|---|---|---|
| Epoxy resin | 19.37 | 19.37 |
| Dolomite AA | 22.60 | 22.60 |
| Gellant | 0.20 | 0.20 |
| Coal-tar oil | 27.45 | 27.45 |
| Flexibilizer, poly(vinyl ethyl ether) | 3.23 | 3.23 |
| ASP-400 | 22.41 | 22.41 |
| Flexible polyamine hardener | | 3.49 |
| Polyamine X hardener | 3.49 | |
| Catalyst | 0.78 | 0.78 |

| | Example 4 | Example 5 |
|---|---|---|
| Adhesion promoter | 0.47 | 0.47 |
| Adhesive Strength Properties | | |
| Lap-shear strength, psi, | | |
| at −40°F | 3250 | 2700 |
| at 77°F | 3250 | 3050 |
| at 145°F | 1750 | 1750 |
| at 77°F after 28 days in water | 2950 | 2950 |
| 180-Degree peel strength, ppi, | | |
| at −40°F | 12 | 30 |
| at 77°F | 35 | 30 |
| at 145°F | 30 | 20 |
| Climbing-drum peel strength, ippi, at 77°F | 25 | 20 |

I claim:

1. An epoxy type adhesive composition comprising 15 to 60 weight percent glycidyl polyether of a dihydric phenol having an epoxy equivalency greater than 1, 25 to 60 weight percent filler, 1 to 7 weight percent flexibilizer, selected from the group consisting of rosin esters, solid polyamide resins, copolymers of butadiene and styrene, and poly (vinylalkyl ethers) having a molecular weight of from about 5,000 to about 200,000 wherein the alkyl group has from one to five carbon atoms, 0.5 to 10 weight percent mono- or di-nuclear aromatic dihydroxy compound and 0.8 to 17 weight percent two-component curing agent comprising 0.5 to 14 weight percent of an amine hardener and 0.3 to 3 weight percent of a rigidifying tertiary amine catalyst having from six to 20 carbon atoms and a boiling point above about 85°C wherein said amine hardener is selected from compounds having the formula $$H_2N(C_nH_{2n})O(C_xH_{2x})NH_2$$

$n$ having a value of 2 to 7 and $x$ having a value of 2 to 7.

2. The composition of claim 1 comprising 18 to 50 weight percent glycidyl polyether of a dihydric phenol, 30 to 60 weight percent filler, 2 to 5 weight percent flexibilizer, 1 to 4 weight percent aromatic dihydroxy compound, 2.5 to 11 weight percent amine hardener and 0.5 to 2 weight percent rigidifying tertiary amine catalyst.

3. The composition of claim 1 comprising 10 to 40 weight percent of an aromatic oil boiling in the range of 500° – 900°F.

4. The composition of claim 1 comprising 15 to 30 weight percent of coal-tar oil boiling in the range of 670° – 850°F.

5. The composition of claim 1 comprising 0.2 to 2 weight percent adhesion promoter selected from silicone and silane adhesion promoters.

6. The composition of claim 1 wherein the flexibilizer is poly(vinyl ethyl ether).

7. The composition of claim 3 wherein the filler is a mixture of dolomite and talc, the flexibilizer is poly (vinyl ethyl ether), and the aromatic dihydroxy compound is resorcinol.

8. The composition of claim 1 wherein the empirical formula of the amine hardener is $C_8H_{20}N_2O$.

9. The composition of claim 1 wherein the empirical formula of the amine hardener is $C_9H_{22}N_2O$.

10. The composition of claim 1 wherein the empirical formula of the amine hardener is $C_{10}H_{24}N_2O$.

* * * * *